United States Patent
Kuwata et al.

(10) Patent No.: US 7,509,577 B2
(45) Date of Patent: Mar. 24, 2009

(54) METHOD AND SYSTEM FOR IMPLEMENTING A CLIPBOARD

(75) Inventors: Katie Kuwata, Oceanside, CA (US); William Su, Corona, CA (US); Truc Nguyen, San Diego, CA (US)

(73) Assignees: Toshiba Corp oration (JP); Toshiba Tec Kabushiki Kaisha (JP)

( * ) Notice: Subject to any disclaimer, the term of this patent is extended or adjusted under 35 U.S.C. 154(b) by 330 days.

(21) Appl. No.: 10/384,005

(22) Filed: Mar. 7, 2003

(65) Prior Publication Data

US 2004/0039995 A1 Feb. 26, 2004

Related U.S. Application Data

(60) Provisional application No. 60/362,826, filed on Mar. 8, 2002.

(51) Int. Cl.
*G06F 17/00* (2006.01)
*G06F 17/20* (2006.01)
*G06F 15/16* (2006.01)

(52) U.S. Cl. .................... 715/256; 715/255; 709/203

(58) Field of Classification Search ............... 715/531, 715/530, 255, 256; 709/203; 714/2
See application file for complete search history.

(56) References Cited

U.S. PATENT DOCUMENTS

| | | | | |
|---|---|---|---|---|
| 4,507,751 A | * | 3/1985 | Gawlick et al. | 707/202 |
| 5,133,066 A | * | 7/1992 | Hansen et al. | 707/203 |
| 5,337,407 A | * | 8/1994 | Bates et al. | 715/751 |
| 5,649,105 A | * | 7/1997 | Aldred et al. | 709/220 |
| 5,732,219 A | * | 3/1998 | Blumer et al. | 709/227 |
| 5,734,905 A | * | 3/1998 | Oppenheim | 719/315 |
| 5,758,361 A | * | 5/1998 | van Hoff | 715/513 |
| 5,761,684 A | * | 6/1998 | Gibson | 715/515 |
| 5,765,156 A | * | 6/1998 | Guzak et al. | 707/100 |
| 5,796,934 A | * | 8/1998 | Bhanot et al. | 714/4 |
| 5,870,764 A | * | 2/1999 | Lo et al. | 707/203 |
| 5,892,915 A | * | 4/1999 | Duso et al. | 709/219 |

(Continued)

FOREIGN PATENT DOCUMENTS

EP 1-030-504 A2 * 8/2000

(Continued)

OTHER PUBLICATIONS

Galli, Ricardo, et al., "Mu3D: A Causal Consistency Protocol for a Collaborative VRML Editor", VRML 2000, Monterey, CA, Feb. 2000, pp. 53-62 [ACM 1-58113-211-May 2002].*

(Continued)

*Primary Examiner*—John E Breene
*Assistant Examiner*—Robert Stevens
(74) *Attorney, Agent, or Firm*—Tucker Ellis & West LLP

(57) ABSTRACT

The present invention provides a method and system for implementing a pointer-based clipboard. The clipboard system comprises a plurality of information or description files for storing information about files that are edited, in addition to files for storing information relating to changes made to a document and to locations of temporary files relating to the document. In addition, the system employs temporary storage which is preferably deleted upon session termination.

25 Claims, 3 Drawing Sheets

U.S. PATENT DOCUMENTS

| | | | | |
|---|---|---|---|---|
| 5,897,650 | A | * | 4/1999 | Nakajima et al. ............ 715/539 |
| 5,911,066 | A | | 6/1999 | Williams et al. |
| 5,920,863 | A | * | 7/1999 | McKeehan et al. ............ 707/10 |
| 5,923,845 | A | * | 7/1999 | Kamiya et al. ............... 709/206 |
| 5,924,099 | A | * | 7/1999 | Guzak et al. ................. 707/100 |
| 5,926,633 | A | * | 7/1999 | Takagi et al. ................. 345/619 |
| 5,940,082 | A | * | 8/1999 | Brinegar et al. ............. 345/442 |
| 5,964,834 | A | * | 10/1999 | Crutcher ...................... 709/213 |
| 5,968,119 | A | * | 10/1999 | Stedman et al. ............. 709/219 |
| 5,974,427 | A | | 10/1999 | Reiter |
| 5,987,621 | A | * | 11/1999 | Duso et al. ...................... 714/4 |
| 5,999,943 | A | | 12/1999 | Nori et al. |
| 6,006,239 | A | * | 12/1999 | Bhansali et al. ............. 707/201 |
| 6,055,552 | A | * | 4/2000 | Curry .......................... 715/530 |
| 6,061,058 | A | * | 5/2000 | Owens et al. ................ 715/769 |
| 6,070,175 | A | * | 5/2000 | Mezei .......................... 715/500 |
| 6,097,391 | A | * | 8/2000 | Wilcox ........................ 715/776 |
| 6,111,575 | A | | 8/2000 | Martinez et al. |
| 6,151,611 | A | * | 11/2000 | Siegel .......................... 715/541 |
| 6,177,939 | B1 | * | 1/2001 | Blish et al. ................... 715/770 |
| 6,182,121 | B1 | * | 1/2001 | Wlaschin ..................... 709/215 |
| 6,195,091 | B1 | * | 2/2001 | Harple et al. ................ 715/751 |
| 6,202,100 | B1 | * | 3/2001 | Maltby et al. ................ 719/329 |
| 6,209,021 | B1 | * | 3/2001 | Ahimovic et al. ........... 709/204 |
| 6,226,792 | B1 | | 5/2001 | Goiffon et al. |
| 6,230,173 | B1 | * | 5/2001 | Ferrel et al. .................. 715/513 |
| 6,230,200 | B1 | * | 5/2001 | Forecast et al. ............. 709/226 |
| 6,269,389 | B1 | * | 7/2001 | Ashe ........................... 718/100 |
| 6,278,992 | B1 | * | 8/2001 | Curtis et al. ..................... 707/3 |
| 6,326,983 | B1 | | 12/2001 | Venable et al. |
| 6,351,777 | B1 | * | 2/2002 | Simonoff ..................... 709/250 |
| 6,490,634 | B2 | * | 12/2002 | Coiner ......................... 719/329 |
| 6,516,339 | B1 | * | 2/2003 | Potts et al. ................... 709/203 |
| 6,527,812 | B1 | | 3/2003 | Bradstreet |
| 6,584,493 | B1 | * | 6/2003 | Butler .......................... 709/204 |
| 6,637,020 | B1 | * | 10/2003 | Hammond ................... 717/107 |
| 6,681,371 | B1 | * | 1/2004 | Devanbu ...................... 715/515 |
| 6,687,877 | B1 | * | 2/2004 | Sastry et al. ................. 715/201 |
| 6,871,318 | B1 | * | 3/2005 | Wynblatt et al. ............. 715/201 |
| 6,901,455 | B2 | * | 5/2005 | Gough ............................ 710/8 |
| 6,907,565 | B1 | * | 6/2005 | Huang .......................... 715/513 |
| 6,981,214 | B1 | * | 12/2005 | Miller et al. ................. 715/517 |
| 6,983,328 | B2 | * | 1/2006 | Beged-Dov et al. ......... 709/230 |
| 2001/0009420 | A1 | * | 7/2001 | Kamiwada et al. .......... 345/629 |
| 2002/0004804 | A1 | | 1/2002 | Muenzel |
| 2002/0025085 | A1 | | 2/2002 | Gustafson et al. |
| 2002/0049786 | A1 | * | 4/2002 | Bibliowicz et al. .......... 707/511 |
| 2002/0056003 | A1 | * | 5/2002 | Goswami ..................... 709/227 |
| 2002/0059272 | A1 | * | 5/2002 | Porter .......................... 707/100 |
| 2002/0065848 | A1 | * | 5/2002 | Walker et al. ................ 707/511 |
| 2002/0174010 | A1 | * | 11/2002 | Rice, III ........................ 705/14 |
| 2003/0142134 | A1 | * | 7/2003 | Bates et al. .................. 345/770 |
| 2005/0229154 | A1 | * | 10/2005 | Hiew et al. ................... 717/110 |

FOREIGN PATENT DOCUMENTS

| | | | |
|---|---|---|---|
| WO | WO 00/07110 | * | 2/2000 |

OTHER PUBLICATIONS

Halasz, Steven J., et al., "Talking with APL via DDE: Teaching an Old Dog New Tricks", APL '93, © 1993, pp. 104-111.*

Redlich, Jens-Peter, et al., "Distributed Object Technology for Networking", IEEE Communications Magazine, Oct. 1998, pp. 100-111.*

Apperley, Mark, et al., "Breaking the Copy/Paste Cycle: The Stretchable Selection Tool", AUIC 2000, Jan. 31-Feb. 3, 2000, pp. 3-10 (plus citation page).*

Adler, Richard M., "Emerging Standards for Component Software", Computer Magazine, IEEE 0018-9162/95, © 1995, pp. 68-77.*

Dugan Jr., Robert Francis, "A Testing Methodology and Architecture for Computer Supported Cooperative Work Software", PhD Thesis—Rensselaer Polytechnic Institute, May 26, 2000, pp. i-xiii and 1-244 (downloaded from: www.cs.rpi.edu/~dugan/research/thesis.pdf).*

Zafer, Ali Asghar, "NetEdit: A Collaborative Filter", Virginia Polytechnic Institute and State University, Masters of Science in Computer Science Thesis, Blacksburg, VA, Apr. 23, 2001, pp. i-vii and 1-82 (downloaded from: http://scholar.lib.vt.edu/theses/available/etd-05032001-113750/unrestricted/FinalThesis.pdf).*

Brassell, S., et al., "The development of a Remote Editing Service Based on the Telecommunications Information Network Architecture (TINA)", 1999 IEEE AFRICON, Cape Town, South Africa, Sep. 28-Oct. 1, 1999, pp. 371-374.*

Revett, M., et al., "Network Computing: A Tutorial Review", Electronics & Communication Engineering Journal, vol. 13 Issue 1, Feb. 2001, pp. 5-15.*

"File Extension JOU", downloaded from www.liutilities.com/products/winbackup/filetextlibrary/files/JOU/, Sep. 22, 2007, 1 page.*

Elisney, Eric, et al., "EDT Editor Documentation", downloaded from www.atl.lmco.com/projects/csim/gui/edt/edt.html, Mar. 24, 2000, pp. 1-10.*

Preguica, Nuno, et al., "Flexible Data Storage For Mobile Collaborative Applications", ERSADS '99, Sydney, Australia, Apr. 1999, pp. 1-7.*

Atkins, David L., "Version Sensitive Editing: Change History as a Programming Tool", ECOOP '98, Brussels, Belgium, SCM-8 Symposium, Lecture Notes in Computer Science 1439, Jul. 1998, pp. 146-157.*

Thirup, Soren, et al., "ALMA, an Editor for Large Sequence Alignments", Proteins: Structure, Function and Genetics, vol. 7, Issue 3, Wiley-Liss, © 1990, pp. 291-295.*

Goldenson, Dennis R., et al., "Fine Tuning Selection Semantics in a Structure Editor Based Programming Environment: Some Experimental Results", SIGCHI Bulletin, vol. 20, No. 2, Oct. 1988, pp. 38-43.*

DeLine, Robert, et al., "Lessons on Converting Batch Systems to Support Interaction", ICSE '97, Boston, MA, May 17-23, 1997, pp. 195-204.*

Phanouriou, Constantinos, et al., "Transforming Command-Line Driven Systems to Web Applications", Computer Networks and ISDN Systems, vol. 29, Issues 8-13, Sep. 1997, pp. 1497-1505.*

Li, S. F., et al., "What You See Is What I Saw: Applications of Stateless Client Systems in Asynchronous CSCW", CS&I '98, RTP, NC, Oct. 23-28, 1998, pp. 1-5.*

\* cited by examiner

METHOD AND SYSTEM FOR IMPLEMENTING A CLIPBOARD

CROSS-REFERENCE TO RELATED APPLICATIONS

This application claims the benefit of priority from U.S. Provisional Application 60/362,826 filed Mar. 8, 2002.

BACKGROUND OF THE INVENTION

This invention pertains generally to resource management in a session-based embedded web server system, and more particularly to a method and system for implementing a pointer-based clipboard mechanism in a session-based embedded web server system.

A clipboard is a temporary storage area that is used by users and application software to hold data that has been cut or copied from a document. When a user edits a document in an embedded server environment, data that is cut or copied is typically stored in a clipboard. The data stored in a clipboard is suitably pasted into another folder, document or location within the same document. However, embedded servers generally have limited memory and storage resources. Implementing a clipboard generally requires a large buffer storage space to store data and generally consumes significant processing time to transfer data to and from the clipboard. When document data is in raster image format, as when a controller of a digital imaging device ("DID") functions as an embedded server, the storage requirement for implementing a clipboard is particularly large and the negative impact on server processing performance is even more severe than when document data is in non-raster image format. This is due to the fact that raster image files are large files that require significant storage space.

Digital imaging devices ("DID") are complex machines that often perform a plurality of functions. DIDs suitably include devices such as printers, fax machines, scanners, copiers, multi-functional peripherals ("MFPs"), and other like peripheral devices. DIDs are suitably connected to a network or directly to computer. In addition, DIDs are also suitably servers, with all the necessary hardware and software to ensure proper operation of the server as will be appreciated by one skilled in the art. A DID server is also suitably a server of any type, including a web server, an embedded server, a database server, etc. as will be appreciated by one skilled in the art.

Because multiple users have access to an embedded server and because each user can run concurrent multiple sessions with the embedded server, such as a DID, a separate clipboard is suitably created for each user and for each session. The additional storage space and server time required to implement a plurality clipboards decreases the efficiency of the DID because the processing time and storage space required to implement the clipboards cannot be used for document processing and printing.

There are a variety of methods known in the art for improving processor performance in servers, especially servers with multiple processors. For example, symmetric multi-processing ("SMP") has become the de facto standard for multi-processor hardware architectures. Several highly popular operating systems ("OS") incorporate support for SMP. The basic abstraction of an SMP system is a Multi-Threaded Environment ("MTE"), which is provided by the OS without regard to the actual number of processors running. Therefore, when software is written to make use of a MTE, one can achieve a performance improvement whether or not the SMP hardware platform contains multiple processors.

However, even though improved processor performance can be achieved through the use of SMP, it is always preferable to decrease required resources, both in processing and storage. Therefore, it would be preferable if there were an improved method of providing a clipboard that utilizes fewer resources.

SUMMARY OF THE INVENTION

In accordance with the present invention, there is provided a method and system for maintaining a clipboard buffer that utilizes fewer resources. Further, in accordance with the present invention, there is provided a method for implementing a clipboard buffer for editing a document. The method comprises the steps of: storing of data representative of an editable, electronic document in a storage area; communicating data for generating a display of the electronic document to an associated display device; receiving document selection data representative of a selected portion of the electronic document; storing pointer information associated with the selected portion in a pointer memory; and selectively performing an edit operation to at least one electronic document with the selected portion which selected portion is accessed in accordance with the pointer information. Still further, in accordance with the present invention, there is provided a system for implementing a clipboard buffer for editing a document. The system comprises: storage means adapted for storage of data representative of an editable, electronic document; display out means adapted for communicating data for generating a display of the electronic document to an associated display device; data input means adapted to receive document selection data representative of a selected portion of the electronic document; a pointer memory adapted for storing pointer information associated with the selected portion; and data editor means adapted for selectively performing an edit operation to at least one electronic document with the selected portion which selected portion is accessed in accordance with the pointer information.

These and other aspects of the invention will be understood by one of ordinary skill in the art upon reading the specification.

DETAILED DESCRIPTION OF THE INVENTION

Figure 1:
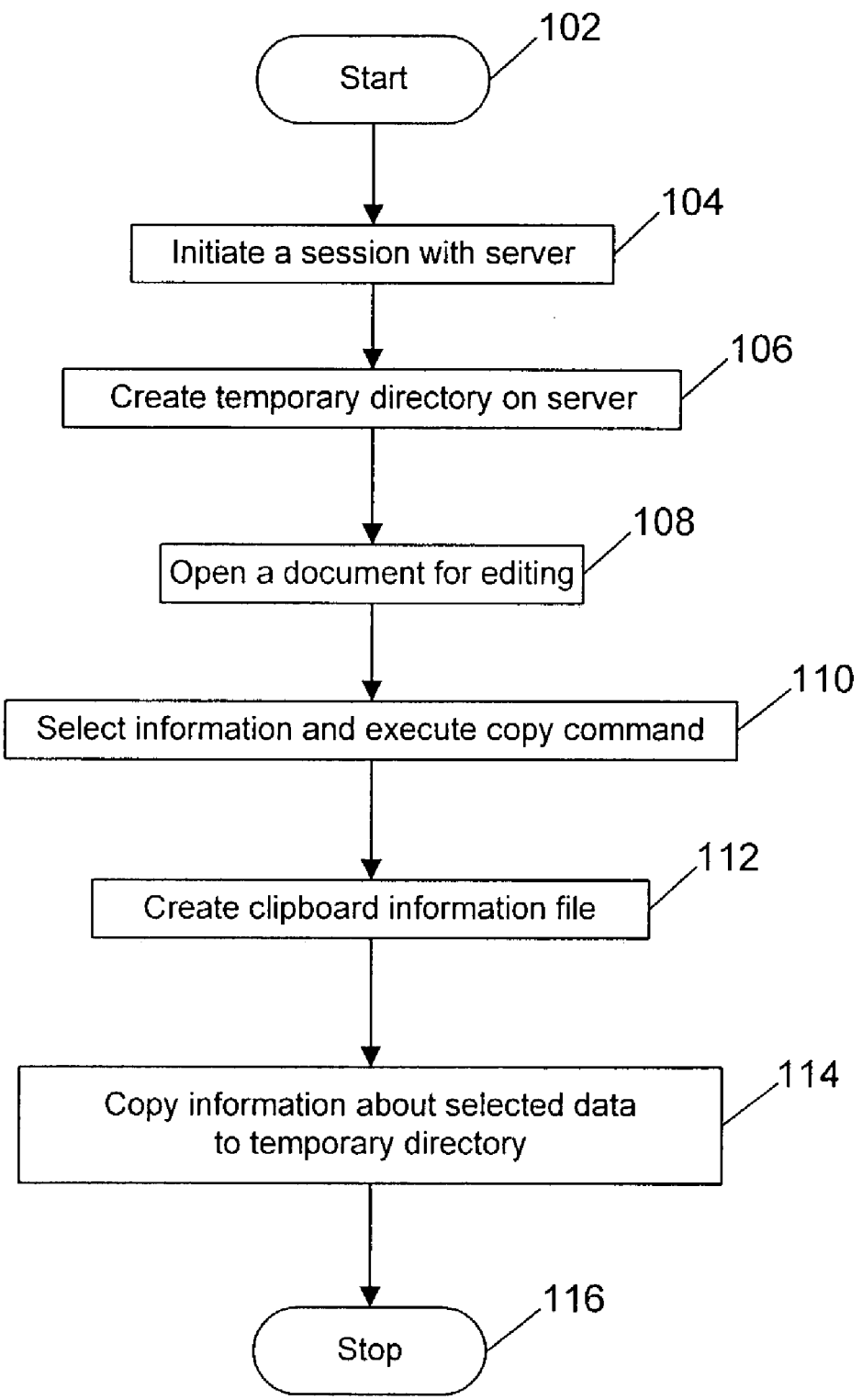
FIG. 1 is a flow chart representing the general procedure for copying data to a clipboard according to the present invention.

Turning now to FIG. 1, a flowchart is provided representing the general process for maintaining a clipboard for pages of a document according to the present invention. The general flow commences at start block 102 and continues to process block 104. At process block 104, a session is initiated, preferably by a user. Progression then flows to process block 106 wherein the server creates a temporary directory for storage of clipboard information. Preferably, the temporary directory is session-based storage such that when the session ends, the directory and its contents are deleted. Flow continues to process block 108 wherein a document is opened for editing. Progression then flows to process block 110 wherein information from at least one page of the opened document is selected and a copy or cut command is executed. In other words, a command is executed that is functional to send to a clipboard information pointing to selected data. Flow progresses to process block 112 where a clipboard information file is created, after which flow proceeds to process block 114 wherein information about the selected data is copied to the temporary directory. Preferably, the information comprises at least the following: a document information file, at least one page information file, and a clipboard information file. Flow then continues to termination block 116.

Figure 2:
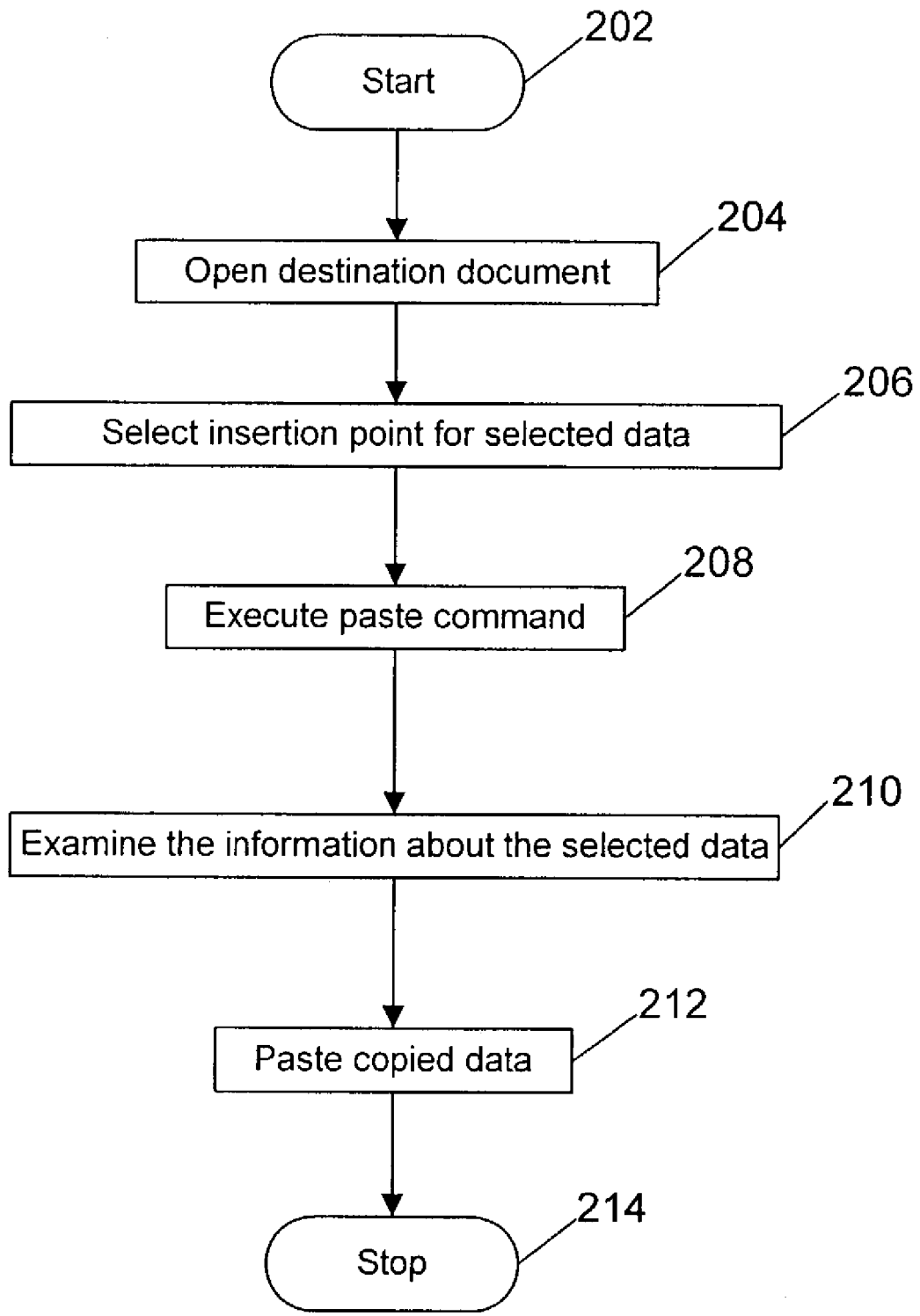
FIG. 2 is a flow chart representing the general procedure for pasting data from a clipboard according to the present invention.

Turning now to FIG. 2, a flowchart is provided representing the general procedure for pasting clipboard information into a document according to the present invention. The general flow commences at start block 202, from which progression is made to process block 204, wherein a destination document is opened. Progression then flows to process block 206 wherein a point of insertion is selected for pasting selected data. Flow then continues to process block 208 wherein a paste command is executed, after which progression flows to process block 210 wherein the information about the selected data is examined. Preferably, such information includes information about at least one page of a document wherein the at least one page contains at least a portion of the selected data. Flow then continues to process block 212 wherein copied data is pasted, after which flow progresses to termination block 214.

Figure 3:
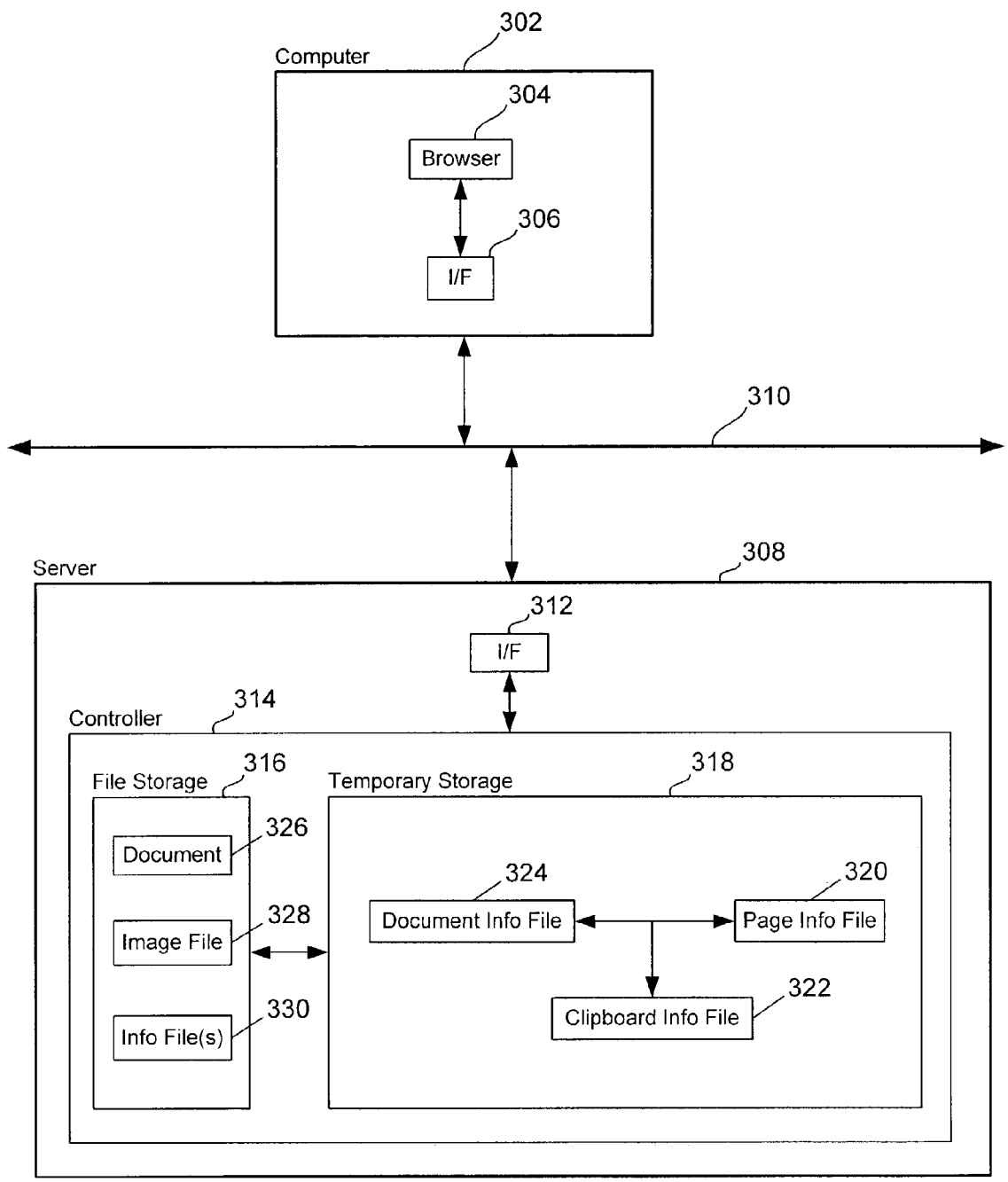
FIG. 3 is a system diagram illustrating a server in a network environment in accordance with the present invention.

Turning now to FIG. 3, a system diagram illustrating a server in a network environment in accordance with the present invention is provided. The network 300 is illustrative of a LAN or WAN environment in which a preferred embodiment is provided. Connected to a network 300 are a computer 302 and a server 308. The network 300 is suitably any network and is suitably comprised of physical and transport layers such as illustrated by a myriad of conventional data transport mechanisms such Ethernet, Token-Ring™, 802.11 (b), or other wire-based or wireless data communication mechanisms as will be apparent to one of ordinary skill in the art. The server 308 is in data communication with a data transport system 310 through a network interface 312. The data transport system 300 is also placed in data communication with the computer 302 through a network interface 306. Thus, a data path between the server 308 is in shared data communication with computer 302.

The computer 302 is suitably any type of computer, but is preferably a PC running an on a Windows, Unix, Macintosh, or Linux based operating system. The computer is suitably a thin client or a thick client, additional server, PDA, or any equipment capable of interacting with Server 308. The computer 302 is preferably equipped with a browser 304 software program and a network interface 306.

The server 308 is suitably any device that is capable of providing selective data access, data archiving, shared access to files, and the like, as will be appreciated to one of ordinary skill in the art. As such, the server 308 suitably runs on any operating system as will be appreciated by those skilled in the art. Preferably, the server 308 is a network DID, such as a MFP, or an DID connected to a computer 302. The server 308 suitably comprises a network interface 312, and a controller 314. The controller 314 suitably comprises file storage 316 and temporary storage 318 which are suitably at least one hard disk and random access memory ("RAM"). The file storage 316 preferably comprises at least one document 326 and at least one image (page) file 328. In addition, the file storage preferably comprises at least one information file 330. The information files 330 suitably comprise both document information files and page information files. The controller 314 preferably acts as a fully functional server with the necessary hardware and software to ensure proper operation of the server as will be appreciated by one skilled in the art. In the presently preferred embodiment, the computer 302 and server 308 form an embedded web server system.

In the presently preferred embodiment, a user begins a session. Each session is suitably a lasting connection between a computer 302 and the server 308, usually involving the exchange of many packets between the computer 302 and the server 308. A session is typically implemented as a layer in a network protocol (e.g. telnet, FTP). The user preferably has a user ID, which is unique to each user, for identification and authentication. In addition, each session preferably has a session ID, which is unique to each session. A user suitably initiates a session through network interface 306, across data transport network 300, through network interface 312 and to the controller 314. When a session is started, the controller 314 preferably creates temporary storage 318, which is preferably a temporary directory. The name of temporary directory 318 is preferably associated with at least one of the session ID and/or user ID.

A user suitably opens a document 326 that is preferably stored in file storage 316 on the controller 314 or on storage external storage accessible by both the server 308 and the computer 302 via data transport system 300. In the presently preferred embodiment, the document 326 is an image document or file comprising images and a plurality of pages. Preferably, each page of the document 326 is also stored in file storage 316 as an image file 328.

When a document 326 is opened, at least one information file 330 is suitably copied from file storage 316 to the temporary directory 318. In the presently preferred embodiment, a document information file 324 comprising information about the opened document is copied to the temporary directory 318. It should be noted that information file 324 is also suitably created, rather than copied, when a document 326 is opened. The information stored in document information file 324 suitably comprises property information such as document type, name, location of the corresponding document 326 in file storage 316, file format, and the number of pages in document 326. In the presently preferred embodiment, the information files 330 are markup language based documents, and are preferably extensible markup language ("XML") files, but any suitable file format is contemplated for information storage, such as text files, flat files, database files, etc. as will be appreciated by one who is skilled in the art. The format of the document information file 324 of the presently preferred embodiment is illustrated below:

```
<?xml version='1.0' encoding='UTF-8'?>
<!--DOCTYPE docinfo SYSTEM "docinfo.dtd"-->
<docinfo>
<doc>
    <name>dana.tac</name>
    <path>/pbfolder/public</path>
    <format>PNG</format>
    <totalpage>5</totalpage>
```

In addition, at least one page information file 320 comprising information about an image file 328 representing a page of the document 326 containing at least a portion of the selected data is suitably copied to the temporary directory 318 when a "copy" or "cut", or other suitable clipboard command is executed. Again, it should be noted that page information file 320 is also suitably created, rather than copied, when the copy of document 326 is stored in the temporary directory. The information stored in page information file 320 suitably comprises property information such as the page number, file format, filename, and file location. Preferably, a page information file 320 exists for each page of the document 326. Therefore, for a five-page document 326, there will preferably be five image files 328 and five page information files 330 stored in file storage 316. In the presently preferred embodiment, the page information file 320 is also an "XML" document. The format of the page information file 320 of the presently preferred embodiment is illustrated below:

```
<?xml version='1.0' encoding='UTF-8'?>
<!--DOCTYPE docinfo SYSTEM "docinfo.dtd"-->
<pageinfo>

<pageformat>PNG</pageformat>
    <filename>dana_1.png</filename>
    <path>/pbfolder/public</path>
```

Also, a clipboard information file 322 is preferably created or copied and stored in temporary storage 318 when selected data is "copied" or "cut". The clipboard information file 322 preferably points to the locations of the files from which data was "copied" or "cut". Preferably, the clipboard information file 322 is created when a copy command is executed. The clipboard information file 322 is preferably a text file, although other types of files for storing information are suitably used as will be appreciated by one who is skilled in the art. The format of the clipboard information file of the presently preferred embodiment is illustrated below:

```
/pbtemp/clipboard/ . . /dana.xml page.
```

For example, if a user opens a document with a name of "dana.tac," selects page 2 and page 3 of document from a browser, and executes a copy command, the controller 314 suitably performs the following functions: copy or create a page information file 320 for each of the image files 328 associated with pages 2 and 3, and create or edit the clipboard information file 322 to read:

```
/pbtemp/clipboard/ . . /dana.xml2 page
/pbtemp/clipboard/ . . /dana.xml3 page.
```

The controller 314 suitably accesses the page information files 320 "dana.xml2" and "dana.xml3". In addition, the document information file 324 "dana.xml" is suitably copied to temporary storage 316 if it was not copied to temporary storage when the document file 326 "dana.tac" was opened. In this manner, when information is "copied," files pointing to information, not actual copies of the information, are stored in temporary storage 318. Because the files pointing to information are generally much smaller than the files storing information, the "copy" process is faster and utilizes fewer resources.

After copying information from a file, such as pages 2 and 3 in the previous example, a user suitably pastes the information into a document, folder or the like. In order to paste the copied information into a document ("the paste document"), a user suitably opens the paste document, selects an insertion point, and executes a "paste" command. For example, if a user wishes to insert the selected data after page 5, the user would open the paste document 326 for pasting copied data and select an insertion point after page 5. The controller 314 then suitably examines the clipboard information file 322 to determine the type of information that was "copied" and the document information file or files 324 corresponding to the file containing at least a portion of the selected data. For example, the type of information is suitably a page of a document. In addition, the controller 314 preferably examines the document information file 324 corresponding to the paste document to determine the number of pages in the paste document. The page information files 320 "dana.xml2" and "dana.xml3" in temporary directory 318 are then preferably used to generate new page information files 320 "dana.xml6" and "dana.xml7," respectively. Examples of the two new page information files 320 are shown below:

```
dana.xml6

<?xml version='1.0' encoding='UTF-8'?>
<!--DOCTYPE docinfo SYSTEM "docinfo.dtd"-->
<pageinfo>

PNG</pageformat>
        <filename>dana_6.png</filename>
        <path>/pbfolder/public</path>
dana.xml7

<?xml version='1.0' encoding='UTF-8'?>
<!--DOCTYPE docinfo SYSTEM "docinfo.dtd"-->
<pageinfo>

<pageformat>PNG</pageformat>
        <filename>dana_7.png</filename>
        <path>/pbfolder/public</path>
```

Furthermore, image files 328 "dana_2.png" and "dana_3.png," which are associated with page information files 320 "dana.xml2" and "dana.xml3," respectively, are duplicated as "dana_13 6.png" and "dana_7.png," respectively. Any image files 328 that represented pages greater than 5 in document 326 prior to pasting the new data are also suitably renamed to correspond with their new page number. In this case, image file 328 "dana_6.png" prior to the execution of the paste command becomes "dana_8.png" after the execution of the paste command. Likewise, the corresponding page information files 320 are suitably renamed and changed to point to the newly renamed image files 328. It will be appreciated by those skilled in the art that if a "cut" command was executed in place of a "copy" command, the appropriate "cut" files (document 326, document information files 330, images files 328, and page information files 330) are suitably removed from their original locations.

In the situation where a user pastes the copied information into a folder, such as a folder in file storage 316, rather than into an existing document, the process is simpler. First, a user selects a folder, such as through use of a browser, and executes a paste command. This operation suitably causes the controller 314 to generate a new document "dana.tac" in the selected folder ("paste folder"). In order to generate the new document, the controller 314 suitably examines the clipboard information file 322 to determine the type of information that was "copied", such as a page of a document. The controller 314 then accesses the document information file 324 "dana.xml" to determine the name of the document or documents 326 containing at least a portion of the selected data. The system then generates a new document information file 324 which is suitably stored in the paste folder in file storage 316. The new document information file 324 suitably reads as follows:

```
<?xml version='1.0' encoding='UTF-8'?>
<!--DOCTYPE docinfo SYSTEM "docinfo.dtd"-->
<docinfo>
    <doc>
        <name>dana.tac</name>
        <path>[paste folder]</path>
        <format>PNG</format>
        <totalpage>2</totalpage>
```

The controller 314 also suitably accesses page information files 320 "dana.xml2" and "dana.xml3" and generates two new page information files 320 "dana.xml1" and "dana.xml2", which are stored in the paste folder in file storage 316. Again, the controller 314 suitably renames the page information files 320 such that they represent the correct page number of the newly created document. The format of the generated page information files is illustrated below:

```
dana.xml1

<?xml version='1.0' encoding='UTF-8'?>
    <!--DOCTYPE docinfo SYSTEM "docinfo.dtd"-->
    <pageinfo>

<pageformat>PNG</pageformat>
            <filename>dana_1.png</filename>
            <path>[paste folder]</path>
dana.xml2

<?xml version='1.0' encoding='UTF-8'?>
    <!--DOCTYPE docinfo SYSTEM "docinfo.dtd"-->
    <pageinfo>

<pageformat>PNG</pageformat>
            <filename>dana_2.png</filename>
            <path>[paste folder]</path>
```

Furthermore, the server suitably gets the filenames of the image files from the page information files and generates "dana_1.png" and "dana_2.png" image files 328 in the paste folder in file storage 316. Again, it will be understood by those skilled in the art that if a "cut" command was executed in place of a "copy" command, the appropriate "cut" files (document 326, document information files 330, images files 328, and page information files 330) are removed from their original locations.

Also in accordance with the present invention, a user is suitably able to select multiple document(s) and/or folder(s) for copying. For example, a user suitably selects a folder "/public/test" in addition to a document "/public/dana.tac" and then executes a copy command. For the purpose of this example, "dana.tac" is a 5 page document. The server suitably copies document information file 324 "dana.xml" and all page information files 320 "dana.xml1", "dana.xml2", "dana.xml3", "dana.xml4", and "dana.xml5" from the their original location to a temporary directory 318. In addition, the server suitably generates a clipboard information file 322 in the same temporary directory. The controller does not copy the folder "/public/test" to the temporary directory 318, but does list the folder in the clipboard information file 322. Therefore, the controller 314 suitably generates a clipboard information file 322 in temporary storage 318 that reads as follows:

```
/public/test folder
/temp/dana.xml page
```

After copying a folder and a document, the same procedure as detailed above is used to paste the copied information, except that a copied folder cannot be pasted into a document. Therefore, if a reference to a folder exists in a the clipboard information file, it is simply ignored if a command is executed to paste copied information into a document. However, the copied page information is still pasted into the selected document at a selected insertion point using the procedure detailed above. While it will be appreciated by those skilled in the art that if a "cut" command was executed in place of a "copy" command, the appropriate "cut" files (document 326, document information files 330, images files 328, and page information files 330) are suitably removed from their original locations, it will also be understood by those skilled in the art that if a user attempts to paste a folder into a document, the folder will not be removed from its original location. The controller 314 will preferably treat the selected folder as if it were never "cut" or "copied".

In order to paste the clipboard information to a folder, a user suitably selects a folder and then executes a "paste" command. For example, for a paste folder suitably located at "/public/test2", the paste operation generates the folder "/public/test2/test" and the file "/public/test2/dana.tac". In order to generate the new document, the controller 314 suitably examines the clipboard information file 322 in the temporary folder 318 to determine the information that was "copied". From the clipboard information file 322, the controller 314 finds the location of the "copied" folder, in this case "/public/test" and creates a duplicate of "/public/test" in the paste folder, which is "/public/test2". In other words, the controller 314 creates a new folder "/public/test2/test". In addition, the controller preferably creates a new document 326 following the procedure detailed above for pasting a document 326 into a folder. If the entire document is selected, all image files 328 and information files 330 are preferably copied to the paste folder. Again, the substitution of a "cut" command causes the cut files to be removed from their original locations.

The temporary folder 318 and files discussed herein act as storage for files that point to clipboard information. When the user ends a session, the associated temporary folder(s) 318 and all files stored in the temporary folder(s) are preferably deleted. In other words, the controller 314 preferably removes the temporary storage 318 when a session is terminated.

Although the preferred embodiment has been described in detail, it should be understood that various changes, substitutions, and alterations can be made therein without departing from the spirit and scope of the invention as defined by the appended claims. It will be appreciated that various changes in the details, materials and arrangements of parts, which have been herein described and illustrated in order to explain the nature of the invention, may be made by those skilled in the area within the principle and scope of the invention as will be expressed in the appended claims.

What is claimed is:

1. A system for remote document editing, comprising:
   storage means disposed on a server adapted for storage of data representative of a plurality of editable, electronic documents;

means adapted for receiving, via at least one thin client interface, a request to edit an electronic document selected from the plurality thereof, which request is accompanied by an identifier associated with a requesting thin client interface;

means adapted for commencing a unique document edit session on each selected electronic document corresponding to each received edit request and associated identifier;

display output means adapted for communicating data, via a thin client interface corresponding to an associated identifier, for generating a display of a corresponding electronic document thereon;

means adapted for storing on the server a session-based document information file associated with each electronic document after receipt of an edit request corresponding thereto, each document information file including at least one of document identifier data, document type data, document location data and document size data;

means adapted for communicating edit data, in a native thin client format and corresponding to at least one edit operation, from the thin client to the server;

means adapted for receiving into a storage on the server, via each thin client interface, the at least one edit operation relative to a corresponding edit session of the electronic document;

data input means adapted for receiving, via each thin client interface, document selection data representative of a selected portion of the electronic document corresponding to an associated edit session;

a clipboard information file, corresponding to each edit session, disposed on the server, which clipboard information file is adapted for storing the selected portion of a corresponding electronic document;

a pointer memory disposed on the server adapted for storing pointer information corresponding to an edit session associated with the selected portion of a corresponding electronic document;

data editor means adapted for selectively performing, on the server, an edit operation to at least one electronic document with each selected portion and edit data received from the storage, which selected portion is accessed in accordance with associated pointer information and the document information file upon termination of a document edit session on a corresponding thin client interface; and means adapted for storing each edited electronic document in the storage means.

2. The system of claim 1 wherein the edit operation is at least one of cut, copy, and paste of selection portion relative to at least one selected electronic document.

3. The system of claim 1 wherein the document information file is stored in a format selected from markup language based files, flat files, text files, and database files.

4. The system of claim 1 wherein the document information storage means is temporary.

5. The system of claim 4 wherein the document information storage means is associated with at least one of a session identifier and a user identifier.

6. The system of claim 1 further comprising:
page information storage means adapted for storage of data representative of each page of the document and wherein the data representative of each page is stored in a separate file.

7. The system of claim 6 wherein the page information storage means is temporary.

8. The system of claim 6 wherein the page information storage means is associated with at least one of a session identifier and a user identifier.

9. The system of claim 6 further comprising page property information storage means adapted for storage of property information about each page, wherein the page property information is stored as a file in a format selected from markup language based files, flat files, text files, and database files.

10. The system of claim 1 further comprising means adapted for creating a document information file associated with the electronic document after receipt of an edit request.

11. A method for remote document editing, comprising the steps of:
storing of data representative of a plurality of editable, electronic documents in a storage area disposed on a server;

receiving, via at least one thin client interface, a request to edit an electronic document selected from the plurality thereof, which request is accompanied by an identifier associated with a requesting thin client interface;

commencing a unique document edit session on each selected electronic document corresponding to each received edit request and associated identifier;

communicating data, via a thin client interface corresponding to an associated identifier, for generating a display of a corresponding electronic document thereon;

storing a session-based document information file associated with each electronic document after receipt of an edit request corresponding thereto on the server, each document information file including at least one of document identifier data, document type data, document location data and document size data;

communicating edit data, in a native thin client format and corresponding to at least one edit operation, from the thin client to the server;

receiving into a storage area on the server, via each thin client interface, the at least one edit operation relative to a corresponding edit session of the electronic document;

receiving, via each thin client interface, document selection data representative of a selected portion of the electronic document corresponding to an associated edit session;

storing the selected portion of a corresponding electronic document in a clipboard information file corresponding to each edit session on the server;

storing pointer information corresponding to an edit session associated with the selected portion of a corresponding electronic document in a pointer memory on the server; and selectively performing an edit operation, via the server, to at least one electronic document with each selected portion and edit data retrieved from the storage which selected portion is accessed in accordance with associated pointer information and the document information file upon termination of a document edit session on a corresponding thin client interface; and storing an edited electronic document in the storage area.

12. The method of claim 11 wherein the edit operation is at least one of cut, copy, and paste of selection portion relative to at least one selected electronic document.

13. The method of claim 11 wherein the document information file is stored in a format selected from markup language based files, flat files, text files, and database files.

14. The method of claim 11 wherein the document information storage area is temporary.

15. The method of claim 14 wherein the document information storage area is associated with at least one of a session identifier and a user identifier.

16. The method of claim 11 further comprising the step of storing data representative of each page of the document in a page information storage area and wherein the data representative of each page is stored in a separate file.

17. The method of claim 16 wherein the page information storage area is temporary.

18. The method of claim 16 wherein the page information storage area is associated with at least one of a session identifier and a user identifier.

19. The method of claim 16 further comprising the step of storing property information about each page in a page property information storage area, wherein the page property information is stored as a file in a format selected from markup language based files, flat files, text files, and database files.

20. The method of claim 11 further comprising the step of creating a document information file associated with the electronic document after receipt of an edit request.

21. A computer implemented method for remote document editing, comprising the steps of:
    storing of data representative of a plurality of editable, electronic documents in a storage area disposed on a server;
    receiving, via at least one thin client interface, a request to edit an electronic document selected from the plurality thereof, which request is accompanied by an identifier associated with a requesting thin client interface;
    commencing a unique document edit session on each selected electronic document corresponding to each received edit request and associated identifier;
    communicating data, via a thin client interface corresponding to an associated identifier, for generating a display of a corresponding electronic document thereon;
    storing a session-based document information file associated with each electronic document after receipt of an edit request corresponding thereto on the server, each document information file including at least one of document identifier data, document type data, document location data and document size data;
    communicating edit data, in an native thin client format and corresponding to at least one edit operation, from the thin client to the server;
    receiving into a storage on the server, via each thin client interface, the at least one edit operation relative to a corresponding edit session of the electronic document;
    receiving, via each thin client interface, document selection data representative of a selected portion of the electronic document corresponding to an associated edit session;
    storing the selected portion of a corresponding electronic document in a clipboard information file corresponding to each edit session on the server;
    storing pointer information corresponding to an edit session associated with the selected portion of a corresponding electronic document in a pointer memory on the server;
    selectively performing an edit operation to at least one electronic document with each selected portion and edit data retrieved from the storage, which selected portion is accessed in accordance with associated pointer information and the document information file upon termination of a document edit session on a corresponding thin client interface; and
    storing each edited electronic document in the storage area.

22. The computer implemented method of claim 21 wherein the edit operation is at least one of cut, copy, and paste of selection portion relative to at least one selected electronic document.

23. The computer implemented method of claim 21 further comprising the step of storing data representative of each page of the document in a page information storage area and wherein the data representative of each page is stored in a separate file.

24. The computer implemented method of claim 23 further comprising the step of storing property information about each page in a page property information storage area, wherein the page property information is stored as a file in a format selected from markup language based files, flat files, text files, and database files.

25. The computer implemented method of claim 21 further comprising the step of creating a document information file associated with the electronic document after receipt of an edit request.

* * * * *